(12) United States Patent
Staretz-Arie et al.

(10) Patent No.: US 12,107,755 B2
(45) Date of Patent: Oct. 1, 2024

(54) METHOD AND A DEVICE FOR ROUTING TRAFFIC ALONG AN IGP SHORTCUT PATH

(71) Applicant: DRIVENETS LTD., Raanana (IL)

(72) Inventors: Ilana Staretz-Arie, Pardesia (IL);
Eliyahu Shmidt, Kiryat Ono (IL);
Alexander Gelberger, Ashdod (IL);
Tamir Gal, Nofit (IL)

(73) Assignee: DRIVENETS LTD., Raanana (IL)

( * ) Notice: Subject to any disclaimer, the term of this patent is extended or adjusted under 35 U.S.C. 154(b) by 165 days.

(21) Appl. No.: 17/617,693

(22) PCT Filed: May 21, 2020

(86) PCT No.: PCT/IL2020/050556
§ 371 (c)(1),
(2) Date: Dec. 9, 2021

(87) PCT Pub. No.: WO2020/250213
PCT Pub. Date: Dec. 17, 2020

(65) Prior Publication Data
US 2022/0255838 A1 Aug. 11, 2022

Related U.S. Application Data

(60) Provisional application No. 62/859,747, filed on Jun. 11, 2019.

(51) Int. Cl.
*H04L 45/02* (2022.01)
*H04L 12/46* (2006.01)
(Continued)

(52) U.S. Cl.
CPC .......... *H04L 45/04* (2013.01); *H04L 12/4633* (2013.01); *H04L 45/24* (2013.01);
(Continued)

(58) Field of Classification Search
CPC ..... H04L 12/4633; H04L 45/04; H04L 45/24; H04L 45/42; H04L 45/50; H04L 45/748
(Continued)

(56) References Cited

U.S. PATENT DOCUMENTS 10,616,063 B1\* 4/2020 Dutta ................... H04L 65/611
2005/0111351 A1\* 5/2005 Shen ...................... H04L 45/22
370/217

(Continued)

OTHER PUBLICATIONS

Wang et al., "Towards an Aggregation-Aware Internet Routing", Jul. 1, 2012, IEEE, 2012 21st International Conference on Computer Communications and Networks (ICCCN) (2012, pp. 1-7) (Year: 2012).\*

(Continued)

*Primary Examiner* — Davoud A Zand
(74) *Attorney, Agent, or Firm* — Browdy and Neimark, PLLC

(57) ABSTRACT

A method, a router and a software are provided for routing communication traffic along a path in a communication network, being an IGP shortcut. The method comprises: providing an IGP shortcut prefix to a routing entity and storing the IGP shortcut prefix in a Routing Information Base (RIB); associating a new flag with an LSP associated with the IGP shortcut prefix, wherein the new flag indicates whether that LSP can serve for conveying traffic when implementing MPLS connectivity; storing information that relates to the new flag at the RIB; identifying LSPs associated with respective IGP shortcut prefixes which qualify to operate as next hop routing paths' candidates, wherein the qualified LSPs are each associated with a flag indicating that the respective qualified LSP is MPLS reachable; selecting an LSP to be a next hop routing path, wherein the selection is made from among the qualified LSPs; and forwarding traffic towards its destination via the next hop LSP.

10 Claims, 3 Drawing Sheets

(51) Int. Cl.
*H04L 45/24* (2022.01)
*H04L 45/42* (2022.01)
*H04L 45/50* (2022.01)
*H04L 45/748* (2022.01)

(52) U.S. Cl.
CPC .............. *H04L 45/42* (2013.01); *H04L 45/50* (2013.01); *H04L 45/748* (2013.01)

(58) Field of Classification Search
USPC ................. 709/230, 232, 235, 238–239, 244
See application file for complete search history.

(56) References Cited

U.S. PATENT DOCUMENTS

| | | | |
|---|---|---|---|
| 2007/0121486 A1* | 5/2007 | Guichard | H04L 45/28 370/216 |
| 2008/0239958 A1 | 10/2008 | Murray et al. | |
| 2009/0296579 A1* | 12/2009 | Dharwadkar | H04L 12/4641 370/235 |
| 2011/0211579 A1 | 9/2011 | Cao | |
| 2017/0324655 A1* | 11/2017 | Vasseur | H04L 45/507 |
| 2019/0215266 A1* | 7/2019 | Filsfils | H04L 45/74 |

OTHER PUBLICATIONS

IETF draft RFC 3906 "Calculating IGP Routes Over Traffic Engineering Tunnels", May 2004.

* cited by examiner

METHOD AND A DEVICE FOR ROUTING TRAFFIC ALONG AN IGP SHORTCUT PATH

TECHNICAL FIELD

The present disclosure generally relates to the field of communication systems. More particularly, the present disclosure relates to the routing traffic flows in MPLS networks.

Glossary

AS—Autonomous System;
BGP—Border Gateway Protocol;
CSPF—Constrained Shortest Path First;
ERO—Explicit Route Object;
FIB—Forwarding Information Base;
FPGA—Field-Programmable Gate Array;
IETF—Internet Engineering Task Force;
IGP—Interior Gateway Protocol;
IS-IS—Intermediate System to Intermediate System;
LSDB—Link State Database;
LSP—Label-Switched Path;
OSPF—Open Shortest Path First;
MPLS—Multiprotocol Label Switching;
SPF—Shortest Path First;
PIC—Prefix Independent Convergence;
RFC—Request for Comments;
RIB—Route Information Base;
RSVP—Resource Reservation Protocol;
TE—Traffic Engineering;
TED—Traffic Engineering Database,
TLV—Type-Length-Value.

BACKGROUND

Multiprotocol Label Switching (MPLS) is a packet-routing technique used in telecommunication networks in which data is forwarded from one node to the next by using short path labels rather than long network addresses, thereby avoiding the need to use complex lookups in routing tables in order to take data forwarding decisions. This method enables the building of networks that are adapted to provide a variety of services over a shared infrastructure.

MPLS traffic engineering ("TE") is a method for effectively using available network resources by controlling the path along which data packets are conveyed across MPLS networks. Traffic engineering implemented by using RSVP-TE protocol, is adapted to divert traffic flows from congested links to alternate links that would otherwise not be selected by using the shortest path calculation of Internal Gateway Protocols ("IGP"), such as the protocols IS-IS and OSPF.

Protocol ISO 10589 is an international standard designed to establish connectivity and reachability between end systems and intermediate systems on individual subnetwork.

IS-IS is an interior gateway protocol, designed for use within an administrative domain or a network, which is in contrast to exterior gateway protocols, e.g. Border Gateway Protocol ("BGP") used for routing traffic between autonomous systems ("AS").

The IS-IS protocol is a link-state routing protocol, operating by reliably flooding information required to build a complete network connectivity map and is configured to use the shortest-path-first ("SPF") algorithm to calculate traffic forwarding in the network.

Each IS-IS router generates independently its own database of the network's topology, aggregating the flooded network information. Packets are forwarded in the network, based on the computed ideal path through the network, to the destination.

The RSVP-TE protocol enables providing signals for MPLS Tunnel LSPs through multiple nodes in a network. Once signaled, an LSP can be used for MPLS traffic forwarding. There are multiple ways to route traffic via an LSP, including static routing and IGP shortcut, which is described in IETF RFC 3906.

During each step of the SPF computation, the router determines the path to one node in the network. For traffic engineering purposes, each router maintains a list of all TE-tunnels that originate at that router. For each of these TE-tunnels, the router located at the tail-end, is known.

When a router detects the path to a new node, the router must determine the first-hop information. If the node is not directly connected and is not directly reachable via a TE-tunnel, the first-hop information is copied from the parent node(s) to the new node. The result of this algorithm is that IGP shortcut routes are installed in a Route Information Base (RIB) and traffic to nodes that operate as the tail-end nodes of the TE-tunnels, will be conveyed over those TE-tunnels. Traffic to nodes that are downstream of the tail-end nodes will also be conveyed along those TE-tunnels. If there is a number of possible TE-tunnels that lead to different intermediate nodes along a path which in turn leads to a desired destination node, the TE-tunnel that will be selected to convey the traffic will be the one whose tail-end node is closest to that desired destination node.

The Border Gateway Protocol ("BGP") is a standard exterior gateway protocol which is configured to enable exchanging routing and reachability information among autonomous systems (AS) on the Internet.

Link-state protocols like integrated IS-IS and OSPF, are adapted to enable computing a shortest path tree to all nodes in the network. Routing tables are derived from this shortest path tree. The routing tables contain tuples of destination and first-hop information. If a router carries out a normal hop-by-hop routing, the first-hop will be a physical interface associated with the router. Newer traffic engineering algorithms may also be implemented to enable calculating explicit routes to one or more nodes in the network. At the router that originates an explicit route, such a route can be viewed as a logical interface which provides a Label Switched Path through the network. These Label Switched Paths are considered as Traffic Engineering tunnels (TE-tunnels).

RFC 3906 "Calculating IGP Routes Over Traffic Engineering Tunnels", issued as an IETF draft, describes a mechanism utilizing link-state IGPs to dynamically install IGP routes over those TE-tunnels.

The TE-tunnels are tunnels that are created explicitly by the node performing the calculation, and with an end-point address known to this node. For generating such a tunnel, it does not really matter whether the tunnel itself is strictly or loosely routed. A simple constraint can ensure that the mechanism is a loop free mechanism. Now, let us assume that a router chooses to insert a packet addressed to a destination X. The router may insert the packet into a tunnel having a closer end-point, according to link-state IGP (Interior Gateway Protocol) topology, to the destination X, than the point at which the inserting router is located. In other words, the tail-end of the tunnel has to be a downstream IGP node for the destination X.

IGP shortcuts allow the IGP to use an LSP as the next hop instead of the IGP route. For the sake of implementing the IGP shortcut mechanism, it is typically assumed that the TE-tunnels have already been setup. The TE-tunnels in the network may be used for QoS, bandwidth, redundancy or fast-reroute reasons.

BGP may be used for routing traffic within an autonomous system. In such a case, it will be referred to herein as an Interior Border Gateway Protocol (or iBGP). On the other hand, when it is used for routing traffic towards the Internet, it will be referred to herein as Exterior Border Gateway Protocol (or eBGP).

As the BGP protocol has been extended to carry MPLS label information, there are cases when a BGP label information is advertised over a network where an MPLS-TE is implemented while using IGP shortcuts. In these cases, a TE label would be added to the traffic being conveyed with a BGP label as depicted in FIG. 1.

When such a network topology is implemented, if a TE tunnel fails or in a case where no tunnel exists between two BGP neighbors that exchange label information there-between, another tunnel may be selected in order to forward BGP label traffic, a tunnel which does not terminate at a tail-end node (using an IGP shortcut). In such a case, traffic having BGP labels would be dropped by one of these two network nodes, since that node is not provided with BGP label forwarding information as illustrated in FIG. 2. However, since according to all available signaling protocols (e.g. IS-IS, RSVP-TE and BGP) the network is in a normal state, such a traffic drop will be infinite, and the only way known in the art to overcome such an infinite traffic drop is by using a human intervention (an operator).

The present disclosure seeks to provide a solution aimed to solve the occurrence of infinite traffic drops or of traffic misrouting, by providing a solution which is configured to prevent these problems from happening.

SUMMARY

The disclosure may be summarized by referring to the appended claims.

It is an object of the present disclosure to provide a router, a method and a software for identifying downstream nodes that may be used as a next-hop for conveying traffic along a route extending towards its destination.

It is another object of the disclosure to provide a router, a method and a software to enable avoiding unnecessary dropping of packets associated with addresses having BGP labeled prefixes.

It is another object of the present disclosure to provide a router, a method and a software to enable, in case of implementing BGP PIC for labeled routes, preventing traffic black-holing during BGP fast convergence.

Other objects of the present disclosure will become apparent from the following description.

According to a first embodiment of the present disclosure, there is provided a method for routing communication traffic along a path in a communication network, being an IGP shortcut, wherein the method comprises:

(a) providing an IGP shortcut prefix to a routing entity;
(b) storing the IGP shortcut prefix in a Routing Information Base (RIB) of the routing entity;
(c) associating a new flag with an LSP associated with the IGP shortcut prefix, wherein that newly added flag is adapted to indicate whether that LSP can serve for conveying the communication traffic when implementing MPLS connectivity in the communication network. In other words, there can be many LSPs that pass through a single next hop router whereas only one of them may be a MPLS reachable LSP (one that ends at a tunnel tail-end);
(d) storing information that relates to the new flag at the RIB of the routing entity;
(e) identifying one or more LSPs associated with respective IGP shortcut prefixes, which qualify as candidates to convey communication traffic (e.g. BGP MPLS communication traffic) towards its destination, wherein the one or more qualified LSPs are each associated with a flag indicating that the respective one or more qualified LSPs are MPLS reachable;
(f) selecting an LSP that can be used as a next hop in a routing path for conveying the communication traffic, wherein the selection is made from among the qualified LSPs; and
(g) forwarding the communication traffic towards the destination node along the selected LSP.

The term Interior Gateway Protocol (IGP) shortcut as used herein throughout the specification and claims relates to IGP shortcuts that are carried out on a per-router basis. A router's shortcut computation does not depend on another router performing similar computations, and shortcuts performed by other routers are irrelevant for that matter. The IGP shortcuts are supported for both IS-IS and OSPF and a link-state protocol is required for carrying out these IGP shortcuts. Since an MPLS TE tunnel does not automatically direct traffic, in order to direct traffic to an MPLS TE tunnel, it is possible to configure an Interior Gateway Protocol (IGP) shortcut. An IGP shortcut enables a device to use a TE tunnel as a logical link for IGP route calculation.

According to an embodiment of the present disclosure, step (e) of the method provided, further comprises ignoring all LSPs associated with IGP shortcut prefixes that are not flagged as MPLS reachable from being candidates as LSPs that comprise next hop nodes for conveying the communication traffic towards its destination. (e.g. LSPs that are associated with flags which have the value "false").

According to an embodiment of the present disclosure, the method further comprising a step of receiving a routing information advertisement, which comprises an address for forwarding communication traffic via a Traffic Engineering (TE) tunnel, and determining whether the address for forwarding communication traffic via the TE tunnel identified in the routing information advertisement, comprises a route prefix being an IGP shortcut prefix.

According to still another embodiment, the Traffic Engineering (TE) tunnel is an RSVP-TE tunnel.

According to still another embodiment, in case a BGP PIC is implemented for labeled routes, the method further comprises a step of selecting LSPs that can serve as next-hop routing paths only from among LSPs having addresses that indicate that the respective LSPs are associated with MPLS reachability flags that had already been set to active. By implementing this embodiment, traffic black-holing in prevented during BGP fast convergence.

The term "route prefix" as used herein throughout the specification and claims is used to denote cases where a common portion of the route is used for a group of routes within a router controller.

The term BGP PIC ("Prefix Independent Convergence") is used herein to denote a BGP Fast reroute mechanism which can provide sub second convergence by implementing IGP convergence. BGP PIC uses hierarchical data plane in contrast to a flat FIB design which is used by many legacy platforms.

According to another aspect of the disclosure, there is provided a routing entity (e.g. a router) for use in a communication network implementing a link state protocol, wherein the routing entity comprises:

at least one processor, configured to:
(a) receive an IGP shortcut prefix;
(b) store the IGP shortcut prefix in one or more Routing Information Bases (RIBs) of the routing entity;
(c) associate a new flag with an LSP associated with the IGP shortcut prefix, wherein that newly added flag is adapted to indicate whether that LSP can serve for conveying the communication traffic when implementing MPLS connectivity in the communication network;
(d) store information that relates to the new flag at one or more RIBs of the routing entity;
(e) identify one or more LSPs associated with respective IGP shortcut prefixes that qualify as candidates to be a next hop in a routing path for conveying BGP MPLS communication traffic (e.g. BGP MPLS communication traffic) towards its destination node, wherein the one or more qualified LSPs are each associated with a flag indicating that the respective one or more qualified LSPs are MPLS reachable;
(f) select an LSP that can be used as a next hop routing path for conveying the communication traffic, wherein the selection is made from among qualified LSPs; and
(g) enable forwarding the communication traffic towards the destination node along the selected LSP; and
one or more Routing Information Bases (RIB) configured to store:
addresses for forwarding communication traffic;
IGP shortcut prefix; and
information that relates to the new flags and their association with IGP shortcut prefixes.

According to another embodiment of this aspect, the at least one processor is further configured to ignore all LSPs that are not flagged as MPLS reachable LSPs from being candidates for conveying the communication traffic towards its destination.

By yet another embodiment of this aspect, the at least one processor is further configured to receive a routing information advertisement, which comprises an address for forwarding communication traffic via a Traffic Engineering (TE) tunnel, and wherein the advertisement comprises a route prefix being an IGP shortcut prefix.

In accordance with still another embodiment of this aspect, in case that a BGP PIC is implemented for labeled routes, the at least one processor is configured to select LSPs that can serve for conveying the communication traffic towards its destination from among LSPs whose addresses are stored at the router's RIB, wherein each of the respective LSPs is associated with an MPLS reachability flag that had already been set to active.

In accordance with another aspect of the disclosure, there is provided a computer program product for use in a communication network implementing a link state protocol, wherein the computer program product is configured to encode a computer program stored on a non-transitory computer-readable medium for executing a set of instructions by one or more computer processors for carrying out a method that comprises the steps of:

(a) storing a received IGP shortcut prefix in a Routing Information Base (RIB) of a routing entity;
(b) associating a new flag with an LSP associated with the IGP shortcut prefix, wherein that newly added flag is adapted to indicate whether that LSP can serve for conveying the communication traffic when implementing MPLS connectivity in the communication network;
(c) storing information that relates to the new flag at the RIB;
(d) identifying one or more LSPs associated with respective IGP shortcut prefixes, which qualify as candidates to convey communication traffic towards its destination, wherein the one or more qualified LSPs are each associated with a flag indicating that the respective one or more qualified LSPs are MPLS reachable;
(e) selecting an LSP for use as a next hop routing path for conveying the communication traffic, wherein the selection is made from among the qualified LSPs; and
(f) enable forwarding the communication traffic towards the designation node along the selected LSP.

BRIEF DESCRIPTION OF THE DRAWINGS

The accompanying drawings, which are incorporated herein and constitute a part of this specification, illustrate several embodiments of the disclosure and, together with the description, serve to explain the principles of the embodiments disclosed herein.

DESCRIPTION OF EXEMPLARY EMBODIMENTS

Some of the specific details and values in the following detailed description refer to certain examples of the disclosure. However, this description is provided only by way of example and is not intended to limit the scope of the invention in any way. As will be appreciated by those skilled in the art, the claimed method and device may be implemented by using other methods that are known in the art per se. In addition, the described embodiments comprise different steps that are carried out, not all of which are required in all embodiments of the invention. The scope of the invention can be summarized by referring to the appended claims.

One of the underlying principles of the present disclosure is that in a computer network implementing a link state protocol such as, for example the IS-IS protocol or an OSPF protocol, when an IGP shortcut prefix is inserted in a Routing Information Base (RIB) of a routing element, a new flag is also added in the RIB for the LSP associated with the IGP shortcut prefix, and that newly added flag indicates whether the LSP associated with the IGP shortcut prefix, can be reached when implemented in that network MPLS relationships.

When the Border Gateway Protocol (BGP) is utilized for the conveyance of traffic arriving at a relevant node, the new RIB flag is used by the node's processor(s) to identify the next-hop routing path. The processor implementing the BGP of this example is configured to ignore all next-hop LSPs that are not flagged as MPLS reachable when analyzing BGP labeled prefixes, and consequently unnecessary traffic drops will be avoided.

In an embodiment of the disclosure, when a processor implementing the IS-IS process of the present example, installs a route prefix that is reachable via an RSVP Tunnel, it will preferably perform an additional assessment which is aimed to identify whether the tunnel tail-end is the same node which is associated (e.g. advertised) in the prefix. If the result is positive (true), the new flag will be associated with the prefix, so that the LSP associated with that node will be flagged as an MPLS reachable LSP.

Figure 1:
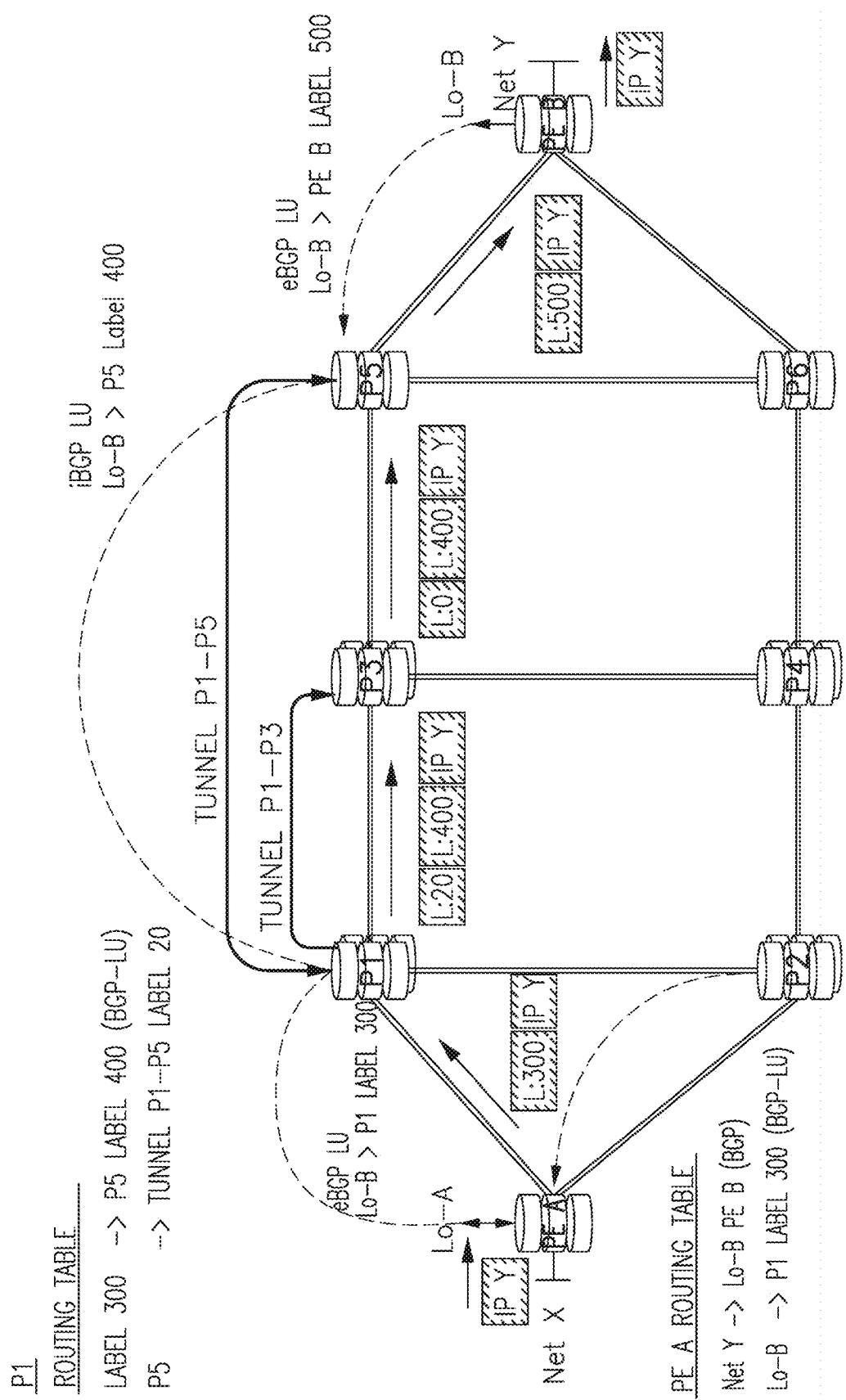
FIG. 1 illustrates a prior art example where a BGP label information is advertised over a network where MPLS-TE is implemented while using IGP shortcuts. In the case illustrated, a TE label is added to traffic being conveyed with a BGP label associated therewith.
Figure 2:
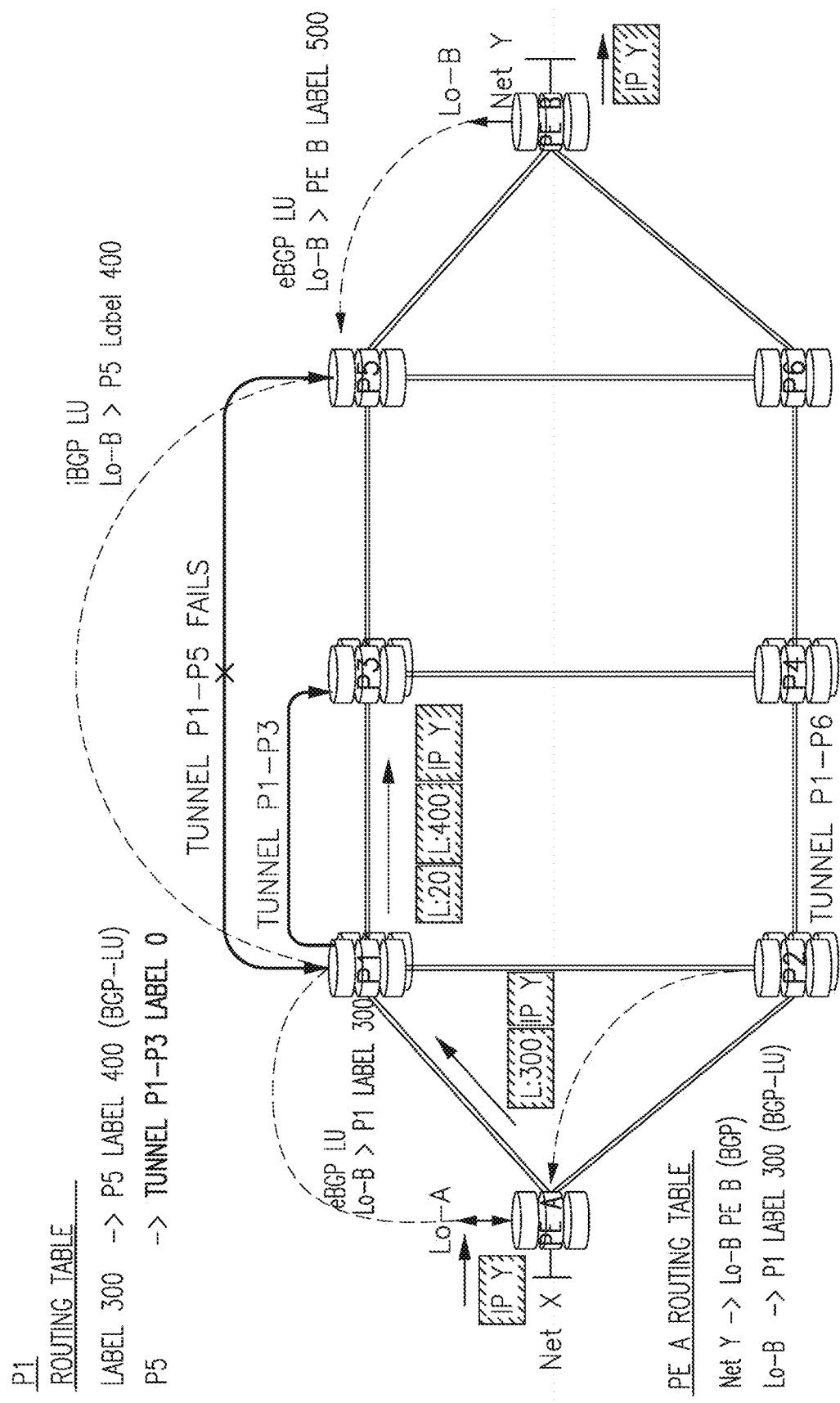
FIG. 2 illustrates another prior art example of a case in which a TE tunnel fails, so that another tunnel is selected in order to forward BGP label traffic, a tunnel which does not terminate at a tail-end node (using an IGP shortcut)
Figure 3:
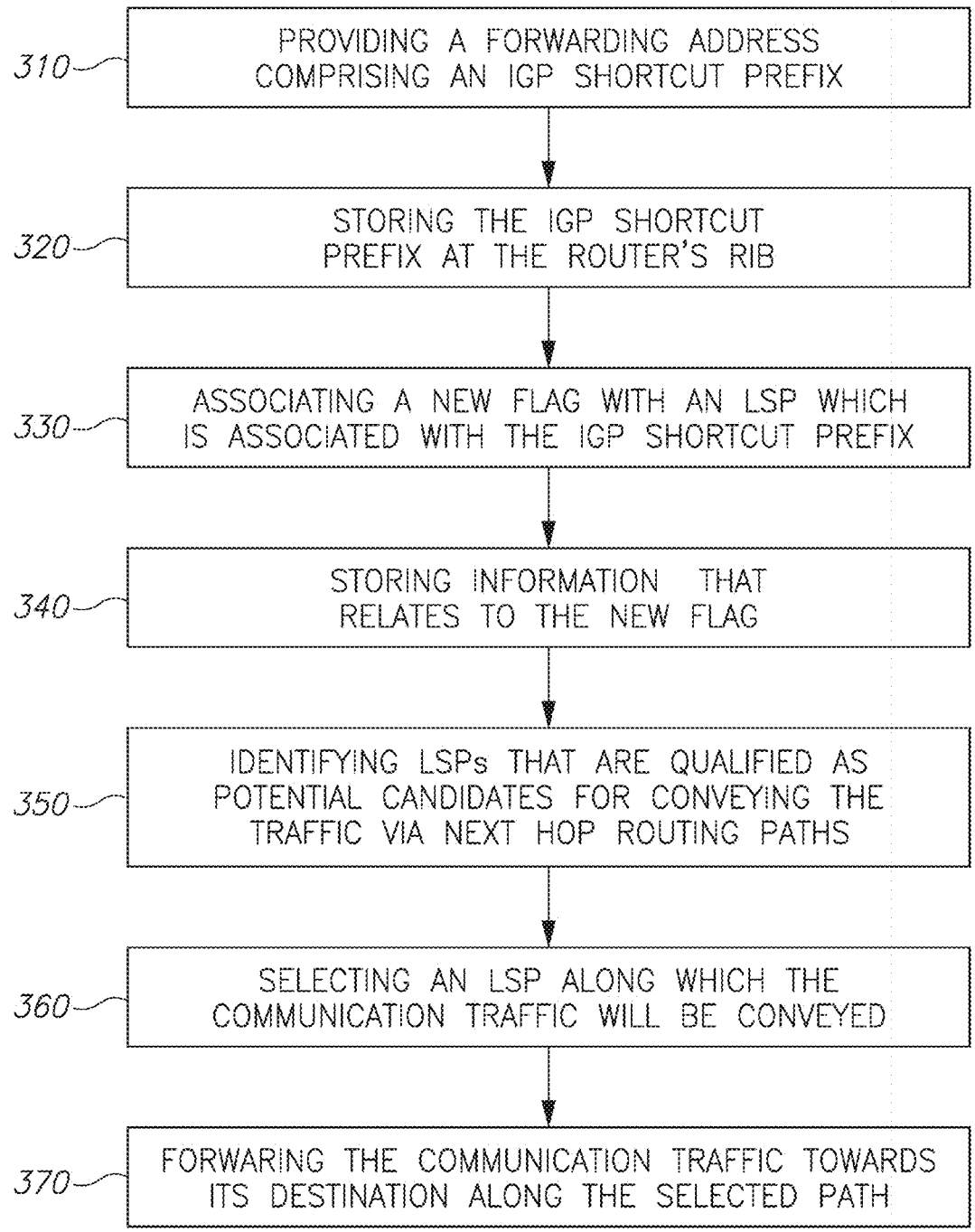
FIG. 3 demonstrates an example of carrying out a method construed in accordance with an embodiment of the present disclosure.

FIG. 3 exemplifies an embodiment of the present disclosure of a method for preventing black-holing or misrouting of BGP signaled MPLS traffic by using IS-IS/OSPF MPLS reachability check in an MPLS network, where BGP labeled routes are used over MPLS TE based on RSVP-TE tunnels. According to this example, the following steps are carried out.

First, an address for forwarding BGP MPLS communication traffic via a Traffic Engineering (TE) tunnel, is provided to a routing entity (step 310), wherein the advertisement comprises a route prefix being an IGP shortcut prefix. The IGP shortcut prefix is then stored in a Routing Information Base (RIB) of the router (step 320). Next, a new flag is associated with an LSP associated with the IGP shortcut prefix, wherein that newly added flag is adapted to indicate whether that LSP can be used when implementing MPLS connectivity in the communication network (step 330) and the information that relates to the new flag is stored at the RIB associated with the routing entity (step 340).

Before forwarding the BGP MPLS communication traffic, one or more LSPs that qualify as candidates for conveying the communication traffic towards its destination are identified (step 350), wherein the one or more qualified LSPs are each associated with a flag indicating that the respective one or more qualified LSPs are MPLS reachable, and at the same time, all LSPs associated with route prefixes that are not flagged as MPLS reachable for conveying the communication traffic towards its destination, are ignored. An LSP is then selected to be an LSP that can serve as a next hop routing path for conveying the communication traffic, while this selection is made from among the qualified LSPs. To better demonstrate the above, let us take an example where a router (i.e. a node) is connected to another router (node) by two links extending there-between, where each router/node comprises two interfaces (one for each link), and wherein one of these links is an MPLS reachable link, while the other link is not. In this example, the router would select the MPLS reachable link as a next hop routing path.

Finally, the communication traffic is forwarded towards the destination node along the selected LSP (step 360).

In another example, where BGP PIC are used for labeled routes, the LSPs that can qualify as next-hops are those associated with MPLS reachability flags that have already set to active (e.g. having the value "true"). As a result, traffic black-holing in prevented for during BGP fast convergence.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. For example, the invention described in present disclosure exemplifying the use of the IS-IS protocol. However, it should be understood that the invention can also be practiced by using the OSPF protocol instead of the IS-IS protocol, mutatis mutandis. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A method for routing communication traffic along a path in a communication network, being an Interior Gateway Protocol (IGP) shortcut, wherein the method comprising:
   (a) providing an IGP shortcut prefix to a routing entity;
   (b) storing the IGP shortcut prefix in a Routing Information Base (RIB) of the routing entity;
   (c) associating a new flag with a Label-Switched Path (LSP) that is associated with the IGP shortcut prefix, wherein that newly added flag is adapted to indicate whether said LSP is configured to enable conveying the communication traffic towards its destination when implementing Multiprotocol Label Switching (MPLS) connectivity in the communication network;
   (d) storing information that relates to the new flag at the RIB of the routing entity;
   (e) identifying one or more of said LSPs associated with respective IGP shortcut prefixes, which qualify as candidates to convey the communication traffic towards the communication traffic destination, wherein the one or more qualified LSPs are each associated with a flag indicating that the respective one or more qualified LSPs are MPLS reachable;
   (f) selecting an LSP suitable for serving as a next hop routing path for conveying the communication traffic, wherein the selection is made from among qualified LSPs; and
   (g) forwarding the communication traffic towards its designation along the selected path.

2. The method of claim 1, wherein step (e) further comprises ignoring all LSPs associated with IGP shortcut prefixes that are not flagged as MPLS reachable from being LSP candidates for conveying the communication traffic towards its destination.

3. The method of claim 1, wherein the provisioning of the IGP shortcut prefix to the routing entity in step (a) comprises providing a routing information advertisement which includes an address for forwarding the communication traffic via a Traffic Engineering (TE) tunnel, and determining whether the address for forwarding the communication traffic via the TE tunnel identified in the routing information advertisement, comprises a route prefix being an IGP shortcut prefix.

4. The method of claim 3, wherein said method further comprising a step of determining whether the address for forwarding the communication traffic via the TE tunnel included in the routing information advertisement, relates to an LSP associated with a node being a tail-end node of the TE tunnel.

5. The method of claim 1, wherein in case a Border Gateway Protocol (BGP) Prefix Independent Convergence (PIC) is implemented for labeled routes, the method further comprises a step of selecting LSPs that is configured to serve as next-hop routing paths, only from among LSPs having addresses that indicate that the respective LSPs are associated with MPLS reachability flags which had already been set to active.

6. A router for routing communication traffic along a path in a communication network, being an Interior Gateway Protocol (IGP) shortcut, wherein the router comprises:
at least one processor, configured to:
(a) receive an IGP shortcut prefix;
(b) store the IGP shortcut prefix in one or more Routing Information Bases (RIBs) of the router;
(c) associate a new flag with an Label-Switched Path (LSP) associated with the IGP shortcut prefix, wherein that newly added flag is adapted to indicate whether that LSP is configured to enable conveying the communication traffic when implementing Multiprotocol Label Switching (MPLS) connectivity in the communication network;
(d) store information that relates to the new flag at one or more RIBs of the router;
(e) identify one or more LSPs associated with respective IGP shortcut prefixes, that qualify as candidates to be a next hop routing path for conveying the communication traffic towards its destination, wherein the one or more qualified LSPs are each associated with a flag indicating that the respective one or more qualified LSPs are MPLS reachable;
(f) select an LSP to be a next hop for conveying the communication traffic, wherein the selection is made from among the qualified LSPs; and
(g) enable forwarding the communication traffic towards the selected LSP; and
one or more Routing Information Bases (RIB) configured to store:
addresses for forwarding communication traffic;
IGP shortcut prefix; and
information that relates to the new flags and their association with IGP shortcut prefix(es).

7. The router of claim 6, wherein said at least one processor is further configured to ignore all LSPs that are not flagged as MPLS reachable from being candidates that may serve as next hop routing path for conveying the communication traffic towards its destination.

8. The router of claim 6, wherein the at least one processor is further configured to receive a routing information advertisement, which comprises an address for forwarding communication traffic via a Traffic Engineering (TE) tunnel, and wherein said advertisement comprises a route prefix being an IGP shortcut prefix.

9. The router of claim 6, wherein in case that a BGP PIC is implemented for labeled routes, said at least one processor is configured to select LSPs that is configured to enable conveying the communication traffic towards its destination from among LSPs whose addresses are stored at the router's RIB, wherein each of these addresses indicates that the respective LSP is associated with an MPLS reachability flag that had already been set to active.

10. A non-transitory computer-readable storage medium storing instructions that, when executed by a one or more computer processors, cause the one or more computer processors to perform a method that comprises the steps of:
(a) storing a received Interior Gateway Protocol (IGP) shortcut prefix in a Routing Information Base (RIB) of a routing entity;
(b) associating a new flag with an Label-Switched Path (LSP) associated with the IGP shortcut prefix, wherein that newly added flag is adapted to indicate whether that LSP is configured to enable conveying the communication traffic when implementing Multiprotocol Label Switching (MPLS) connectivity in the communication network;
(c) storing information that relates to the new flag at said RIB;
(d) identifying one or more LSPs associated with respective IGP shortcut prefixes that qualify as candidates for conveying the communication traffic towards its destination, wherein the one or more qualified LSPs are each associated with a flag indicating that the respective one or more qualified LSPs are MPLS reachable;
(e) selecting an LSP to be a next hop routing path for conveying the communication traffic, wherein the selection is made from among qualified LSPs; and
(f) enable forwarding the communication traffic towards the designation node along the selected LSP.

* * * * *